US006965859B2

(12) United States Patent
Kolesnik et al.

(10) Patent No.: US 6,965,859 B2
(45) Date of Patent: Nov. 15, 2005

(54) METHOD AND APPARATUS FOR AUDIO COMPRESSION

(75) Inventors: Victor D. Kolesnik, St. Petersburg (RU); Boris D. Kudryashov, St. Petersburg (RU); Sergey Petrov, St. Petersburg (RU); Evgeny Ovsyannikov, St. Petersburg (RU); Boris Trojanovsky, St. Petersburg (RU); Andrey Trofimov, St. Petersburg (RU)

(73) Assignee: XVD Corporation, Fremont, CA (US)

( * ) Notice: Subject to any disclaimer, the term of this patent is extended or adjusted under 35 U.S.C. 154(b) by 178 days.

(21) Appl. No.: 10/378,455

(22) Filed: Mar. 3, 2003

(65) Prior Publication Data

US 2004/0172239 A1 Sep. 2, 2004

Related U.S. Application Data

(60) Provisional application No. 60/450,943, filed on Feb. 28, 2003.

(51) Int. Cl.[7] .......................... G10L 19/02; H04B 1/66
(52) U.S. Cl. .................................. 704/200.1; 704/501
(58) Field of Search .......................... 704/200, 200.1, 704/205, 206, 230, 500, 501

(56) References Cited

U.S. PATENT DOCUMENTS 4,048,443 A 9/1977 Crochiere et al.
5,537,647 A * 7/1996 Hermansky et al. ........ 704/211
5,732,189 A 3/1998 Johnston et al.
5,799,270 A 8/1998 Hasegawa
5,832,443 A * 11/1998 Kolesnik et al. ............ 704/500
5,857,000 A 1/1999 Jar-Ferr et al.
5,960,390 A * 9/1999 Ueno et al. .............. 704/200.1
6,058,362 A 5/2000 Malvar
6,263,312 B1 * 7/2001 Kolesnik et al. ............ 704/500
6,308,150 B1 * 10/2001 Neo et al. ................ 704/200.1
6,424,936 B1 7/2002 Shen et al.
6,430,529 B1 8/2002 Huang
6,654,716 B2 * 11/2003 Bruhn et al. ................ 704/219

FOREIGN PATENT DOCUMENTS

WO PCT/US04/04477 6/2005

OTHER PUBLICATIONS

Karelic et al., "Compression of High–Quality Audio Signals Using Adaptive Filterbanks and a Zero–Tree Coder," Eighteenth Convention of Electrical and Electronics Enginners in Israel, 1995, Mar. 7–8, 1995, pp. 3.2.4/1–5.*

* cited by examiner

*Primary Examiner*—Martin Lerner
(74) *Attorney, Agent, or Firm*—Blakey, Sokoloff, Taylor & Zafman LLP

(57) ABSTRACT

A method and apparatus for audio compression receives an audio signal. Transform coding is applied to the audio signal to generate a sequence of transform frequency coefficients. The sequence of transform frequency coefficients is partitioned into a plurality of non-uniform width frequency ranges and then zero value frequency coefficients are inserted at the boundaries of the non-uniform width frequency ranges. As a result, certain of the transform frequency coefficients that represent high frequencies are dropped.

34 Claims, 8 Drawing Sheets

METHOD AND APPARATUS FOR AUDIO COMPRESSION

CROSS REFERENCE TO RELATED APPLICATIONS

This application claims priority from U.S. Provisional Patent Application, Ser. No. 60/450,943 entitled "Method and Apparatus for Audio Compression" filed Feb. 28, 2003.

BACKGROUND OF THE INVENTION

1. Field of the Invention

The invention relates to the field of data compression. More specifically, the invention relates to audio compression.

2. Background of the Invention

To allow typical computing systems to process (e.g., store, transmit, etc.) audio signals, various techniques have been developed to reduce (compress) the amount of data representing an audio signal. In typical audio compression systems, the following steps are generally performed: (1) a segment or frame of an audio signal is transformed into a frequency domain; (2) transform coefficients representing (at least a portion of) the frequency domain are quantized into discrete values; and (3) the quantized values are converted (or coded) into a binary format. The encoded/compressed data can be output, stored, transmitted, and/or decoded/decompressed.

To achieve relatively high compression/low bit rates (e.g., 8 to 16 kbps) for various types of audio signals (e.g., speech, music, etc.), some compression techniques (e.g., CELP, ADPCM, etc.) limit the number of components in a segment (or frame) of an audio signal which is to be compressed. Unfortunately, such techniques typically do not take into account relatively substantial components of an audio signal. Thus, such techniques result in a relatively poor quality synthesized (decompressed) audio signal due to loss of information.

One method of audio compression that allows relatively high quality compression/decompression involves transform coding (e.g., discrete cosine transform, Fourier transform, etc.). Transform coding typically involves transforming an input audio signal using a transform method, such as low order discrete cosine transform (DCT). Typically, each transform coefficient of a portion (or frame) of an audio signal is quantized and encoded using any number of well-known coding techniques. Transform compression techniques, such as DCT, generally provide a relatively high quality synthesized signal, since they have a relatively high-energy compaction of spectral components of an input audio signal.

Most audio signal compression algorithms are based on transform coding. Some examples of transform coders include Dolby AC-2, AC-3, MPEG LII and LIII, ATRAC, Sony MiniDisc and Ogg Vorbis I. These coders employ modified discrete cosine transfer (MDCT) transforms with different frame lengths and overlap factors.

Increasing frame length leads to better frequency resolution. As a result, high compression ratios can be achieved for stationary audio signals by increasing frame length. However, transform frequency coefficient quantization errors are spread over the entire length of a frame. The pursuit of higher compression with larger frame length results in "echo", which appears when sound attacks present in an audio signal input. This means that frame length, or frequency resolution, should be vary depending on the input audio signals. In particular, the transform length should be shorter during sound attacks and longer for stationary signals. However, a sound attack may only occupy part of an entire signal bandwidth.

Large transform length also leads to large computational complexity. Both the number of computations and the dynamic range of transform coefficients increase if transform length increases, hence higher computational precision is required. Audio data representation and arithmetic operations must be performed with at least 24 bit precision if the frame is greater than or equal to 1024 samples, hence 16-bit digital signal processing cannot be used for encoding/decoding algorithms.

In addition, conventional MDCT provides identical frequency resolution over an entire signal, even though different frequency resolutions are appropriate for different frequency ranges. To accommodate the perceptual ability of the human ear, higher frequency resolution is needed for low-frequency ranges and lower frequency resolution is needed for high-frequency ranges.

Furthermore, the amplitude transfer function of conventional MDCT is not "flat" enough. There are significant irregularities near frequency range boundaries. These irregularities make it difficult to use MDCT coefficients for psycho-acoustic analysis of the audio signal and to compute bit allocation. Conventional audio codecs compute auxiliary spectrum (typically with FFT, which is computationally expensive) for constructing a psycho-acoustic model (PAM).

BRIEF SUMMARY OF THE INVENTION

A method and apparatus for audio compression is described. According to one aspect of the invention, a method and apparatus for audio compression provides for receiving an audio signal, applying transform coding to the audio signal to generate a sequence of transform frequency coefficients, partitioning the sequence of transform frequency coefficients into a plurality of non-uniform width frequency ranges, inserting zero value frequency coefficients at the boundaries of the non-uniform width frequency ranges; and dropping certain of the transform frequency coefficients that represent high frequencies.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Overview

A method and apparatus for audio compression is described. According to one embodiment of the invention, a method and apparatus for audio compression generates frequency ranges of non-uniform width (i.e., the frequency ranges are not all represented by the same number of transform frequency coefficients) during encoding of an audio input signal. Each of these non-uniform frequency ranges is processed separately, thus reducing the computational complexity of processing the audio signal represented by the frequency ranges. Partitioning (logical or actual) a transformed audio signal input into non-uniform frequency ranges also enables utilization of different frequency resolutions based on the width of a frequency range.

According to another embodiment of the invention, transform frequency coefficients at the boundary of each of these frequency ranges are displaced with zero-value frequency coefficients (i.e., the frequency ranges are stuffed with zeroes at their boundaries). Stuffing zeroes at the boundaries of the frequency ranges provides for a flattened amplitude transfer function that can be used for quantizing, encoding, and psycho-acoustic model (PAM) computing.

In another embodiment of the invention, normalization and transforms are performed on a set of non-uniform width frequency ranges based on their width. Separately processing different width frequency ranges enables scalability and support of multiple sampling rates and multiple bit rates. Furthermore, separately processing each of a set of non-uniform frequency ranges enables modification of time resolution based on detection of a sound attack within a particular frequency range, independent of the other frequency ranges.

Decoding an audio signal that has been encoded as described above includes extracting frequency ranges from an encoded audio bitstream and processing the frequency ranges separately.

Encoding an Audio Signal

Figure 1:
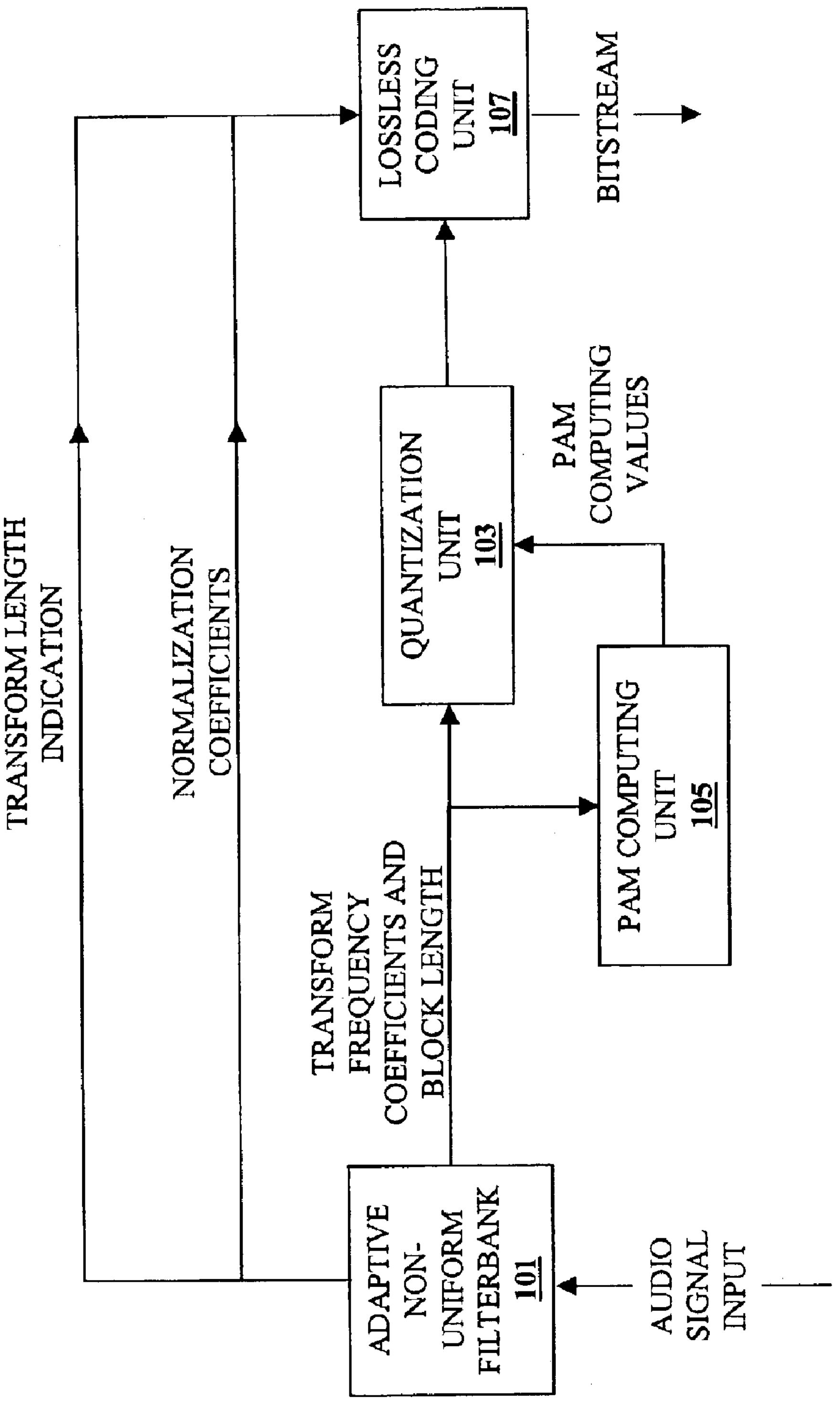
FIG. 1 is an exemplary diagram of an audio encoder with an adaptive non-uniform filterbank according to one embodiment of the invention.

FIG. 1 is an exemplary diagram of an audio encoder with an adaptive non-uniform filterbank according to one embodiment of the invention. In FIG. 1, an adaptive non-uniform filterbank 101 is coupled with a PAM computing unit 105, a quantization unit 103, and a lossless coding unit 107. The adaptive non-uniform filterbank 101 is described at a high level in FIG. 1 and will be described in more detail below. The adaptive non-uniform filterbank 101 receives an audio signal input. The adaptive non-uniform filterbank 101 processes the received audio signal input and generates indications of applied transform length, normalization coefficients, transform frequency coefficients, and block lengths of each frequency range.

The transform frequency coefficients are processed by the adaptive non-uniform filterbank 101 based on the width of their corresponding frequency range and multiplexed together before being transmitted to the quantization unit 103 and the PAM computing unit 105. The transform frequency coefficients can be sent to both the quantization unit 103 and the PAM computing unit 105 because the adaptive non-uniform filterbank 101 has performed zero stuffing on the transform frequency coefficients to flatten the amplitude transfer function. The block lengths sent to the PAM computing unit 105 and the quantization unit 103 indicate the width of each frequency range.

The normalization coefficients sent from the adaptive non-uniform filterbank 101 to the lossless coding unit 107 include a normalization coefficient for each of the non-uniform width frequency ranges generated by the adaptive non-uniform filterbank 101. In an alternative embodiment of the invention, the normalization coefficients are transmitted to the quantization unit 103 in addition to or instead of the lossless coding unit 107.

The adaptive non-uniform filterbank 101 also sends indications of applied transform length to the lossless coding unit 107. The indications of applied transform length indicates whether a short or long transform was performed on a frequency range. The adaptive non-uniform filterbank 101 adapts the length of transform performed on a frequency ranges based on presence of a sound attack within a frequency range.

Figure 2:
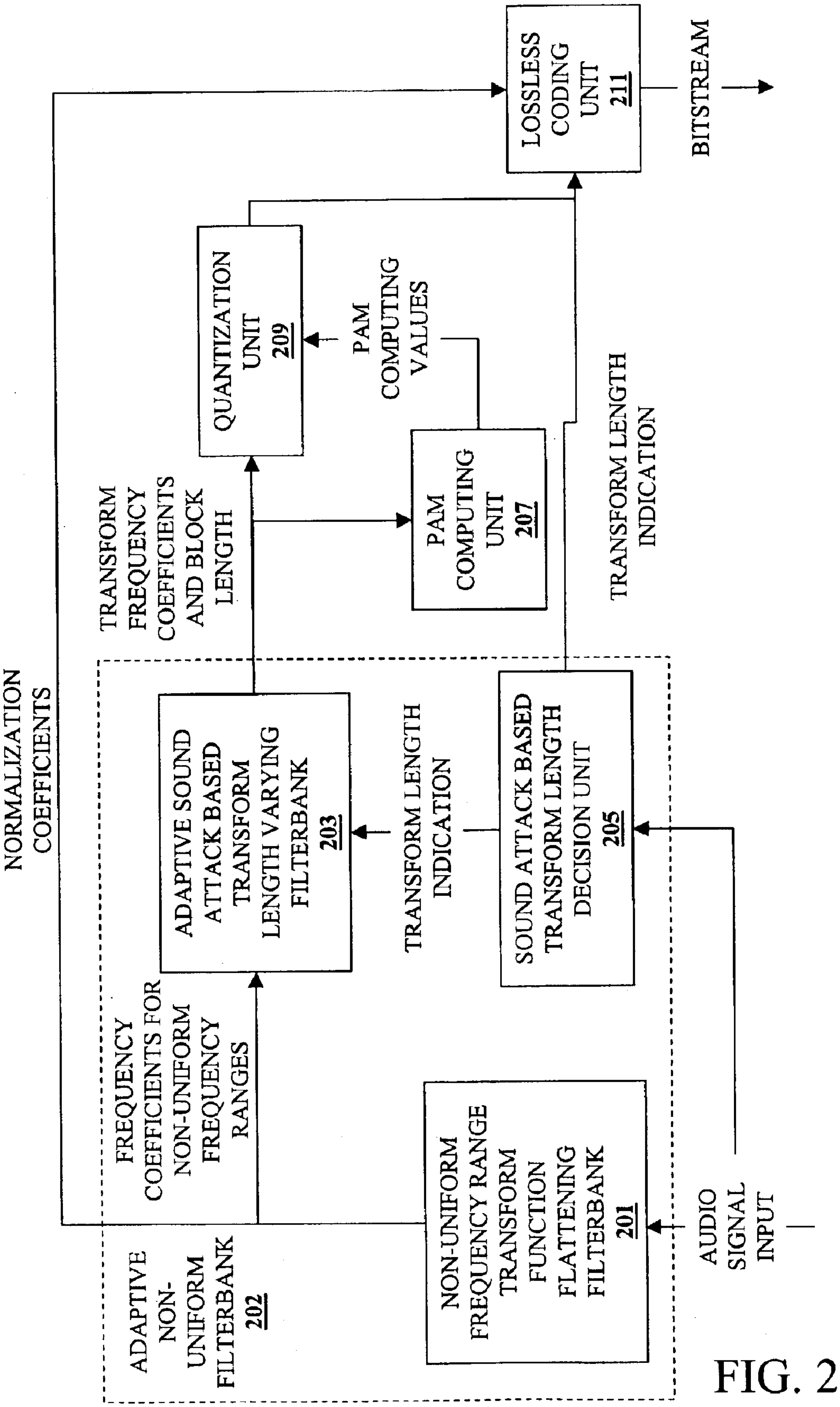
FIG. 2 is a block diagram of an exemplary adaptive non-uniform filterbank according to one embodiment of the invention.
Figure 3:
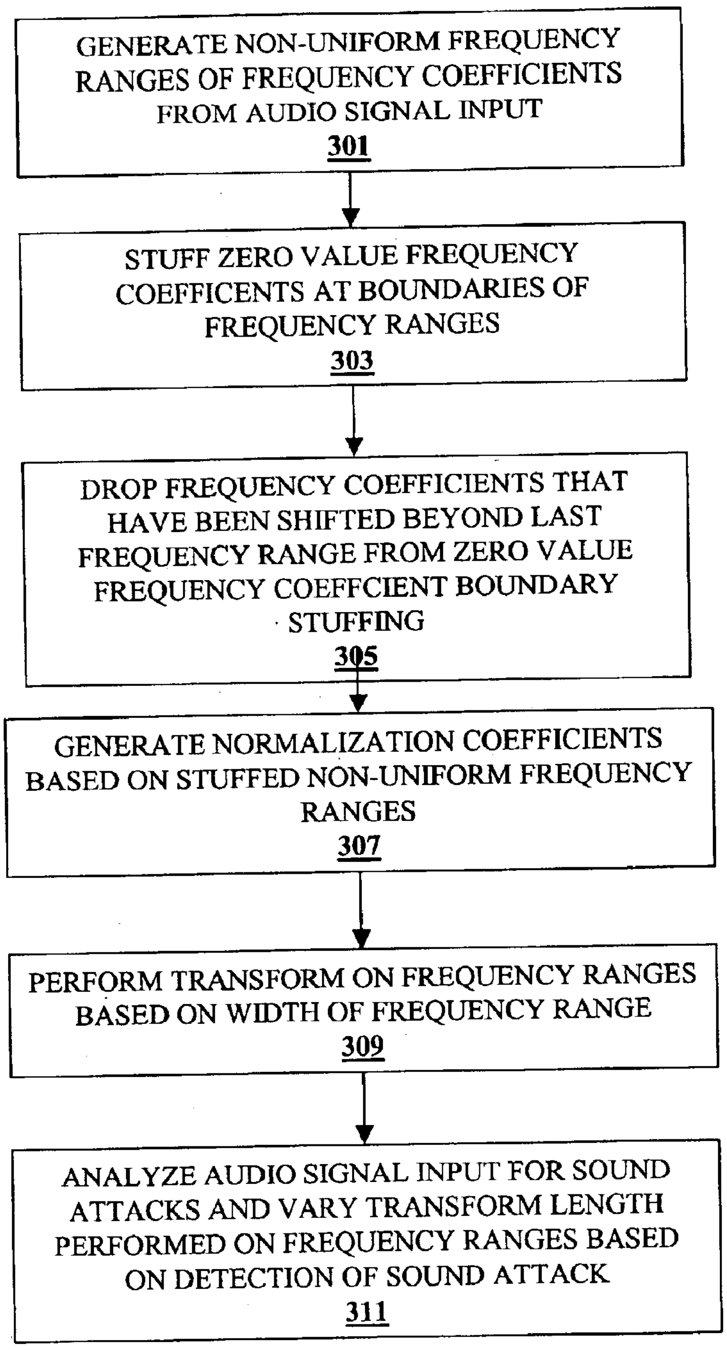
FIG. 3 is a flowchart for encoding an audio signal input according to one embodiment of the invention.

FIG. 2 is a block diagram of an exemplary adaptive non-uniform filterbank according to one embodiment of the invention. FIG. 3 is a flowchart for encoding an audio signal input according to one embodiment of the invention. FIG. 2 will be described with reference to FIG. 3. In FIG. 2, an adaptive non-uniform filterbank 202 includes a non-uniform frequency range transform function flattening filterbank 201, an adaptive sound attack based transform length varying filterbank 203, and a sound attack based transform length decision unit 205.

The non-uniform frequency range transform function flattening filterbank 201 is coupled with the adaptive sound attack based transform length varying filterbank 203. The sound attack based transform length decision unit 205 is also coupled with the adaptive sound attack based transform length varying filterbank 203. In FIG. 2, the non-uniform frequency range transform function flattening filterbank 201 and the sound attack based transform length decision unit 205 both receive an audio signal input. The sound attack based transform length decision unit 205 also (or instead) must receive the output of the non-uniform frequency range transform function flattening filterbank 201 to make independent decisions for different subbands. The original time-domain signal is used to make decisions about the presence of sound attacks over the entire signal.

Referring to FIG. 3 at block 301, the non-uniform frequency range transform function flattening filterbank 201 of FIG. 2 generates non-uniform frequency ranges of transform frequency coefficients from the audio input signal. At block 203, zero value frequency coefficients are stuffed at the boundaries of the frequency ranges. At block 205, the transform frequency coefficients that have been shifted beyond the last frequency range because of zero value frequency coefficient stuffing are dropped.

Figure 4:
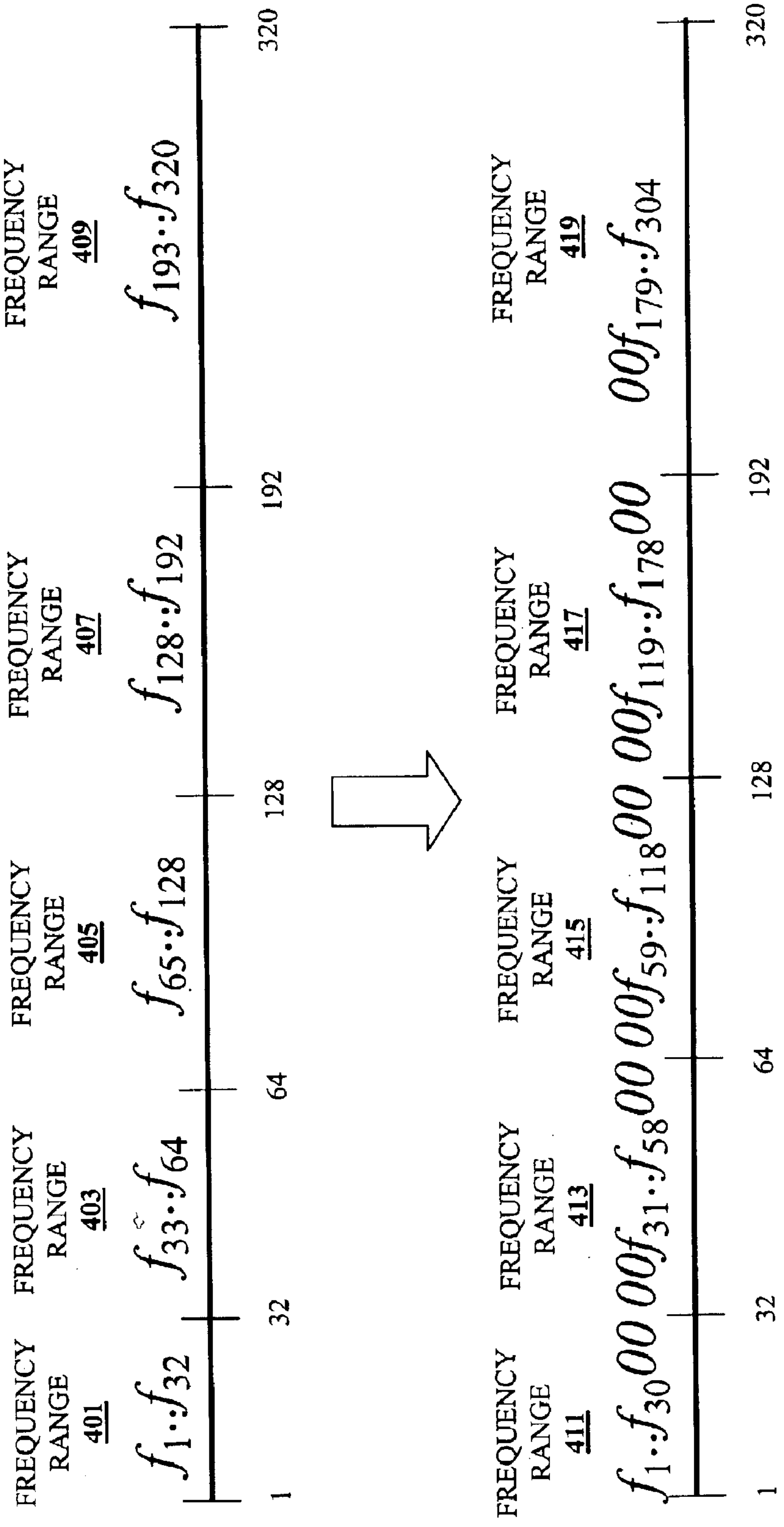
FIG. 4 is a diagram illustrating exemplary zero value frequency coefficient stuffing according to one embodiment of the invention.

FIG. 4 is a diagram illustrating exemplary zero value frequency coefficient stuffing according to one embodiment of the invention. In FIG. 4, a line diagram indicates 320 transform frequency coefficients. The 320 transform frequency coefficients have been partitioned into 5 frequency ranges (also referred to as subbands). Frequency ranges 401, 403, 405, 407, and 409 respectively include transform frequency coefficients 1–32, 33–64, 65–128, 128–192, and 193–320. In alternative embodiments of the invention greater or fewer frequency ranges may be generated. Also, a greater or fewer number of transform frequency coefficients may be generated.

After zero value frequency coefficient stuffing, a different set of frequency ranges are generated. A frequency range 411 includes transform frequency coefficients 1–30 and two zero value frequency coefficients at the end of the frequency range 411. Frequency ranges 413, 415, and 417 each include two zero value frequency coefficients at their beginning and at their end. Between the boundary zero value frequency coefficients, the frequency ranges 413, 415, and 417 respectively include transform frequency coefficients 31–58, 59–118, and 119–178. The last frequency range 419 includes two zero value frequency coefficients at the beginning of the range and transform frequency coefficients 179–304. As illustrated by FIG. 4, stuffing sixteen zero value frequency coefficients at the boundaries of the frequency ranges has resulted in the last sixteen transform frequency coefficients being shifted out of the last frequency range 419 and dropped. Typically, the frequency coefficients that are dropped represent frequencies that are not perceivable by the human ear. Although FIG. 4 has been described with reference to stuffing two zero value frequency coefficients at the boundaries of frequency ranges, a lesser number or greater number of zero value frequency coefficients can be stuffed at the boundaries of frequency ranges.

As previously stated, displacing transform frequency coefficients at the boundaries of frequency ranges with zero value frequency coefficients flattens the amplitude transfer function for the represented audio signal. Flattening the transfer function enables the same transform coefficients to be used for PAM construction and quantization and encoding.

Returning to FIG. 3, normalization coefficients are generated based on the zero stuffed non-uniform frequency ranges at block 307. At block 309, transform is performed on frequency ranges based on width of the frequency range. At block 311, the audio signal and transform frequency coefficients are analyzed for sounds attacks and the transform length performed on frequency ranges is varied based on detection of a sound attack.

Referring to FIG. 2, the sounds attack based transform is performed by the adaptive sound attack based transform length varying filterbank 203. The sound attack based transform length decision unit 205 of FIG. 2 determines if a sound attack is present in a particular frequency range and indicates to the adaptive sound attack based transform length varying filterbank 203 the appropriate transform length that should be applied.

The sound attack based transform length decision unit 205 is coupled with a lossless coding unit 211 and sends indications of applied transform lengths to the lossless coding unit 211. The adaptive sound attack based transform length varying filterbank 203 is coupled with a quantization unit 209 and a PAM computing unit 207. The adaptive sound attack based transform length varying filterbank 203 sends transform frequency coefficients and block length to the quantization unit 209 and the PAM computing unit 207.

The non-uniform frequency range transfer function flattening filterbank 201 is coupled with the lossless coding unit 211. The non-uniform frequency range transfer function flattening filterbank 201 generates normalization coefficients as described at block 307 in FIG. 3 and sends these generated normalization coefficients to the lossless coding unit 211. In an alternative embodiment of the invention, the normalization coefficients are sent to the quantization unit 209.

Partitioning a signal into multiple frequency ranges and processing the multiple frequency ranges separately reduces the complexity of the encoded audio signal and enables flexibility of the algorithm.

Figure 5:
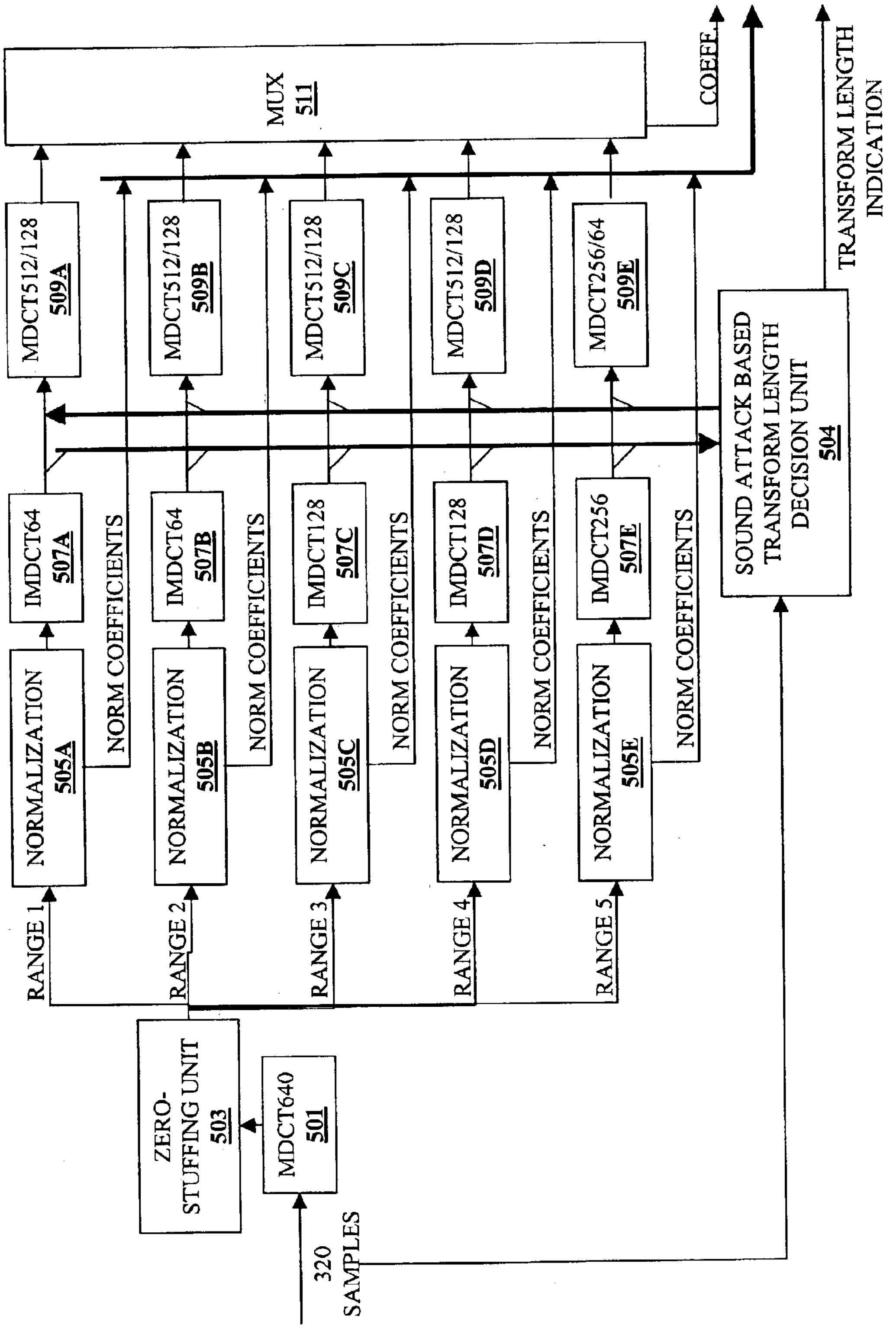
FIG. 5 is a block diagram of an exemplary audio encoding unit with a non-uniform frequency range transfer function flattening filterbank and a adaptive sound attack based transform length varying filterbank according to one embodiment of the invention.

FIG. 5 is a block diagram of an exemplary audio encoding unit with a non-uniform frequency range transfer function flattening filterbank and a adaptive sound attack based transform length varying filterbank according to one embodiment of the invention. In FIG. 5, a modified discrete cosine transform 640 (MDCT640) unit 501 receives 320 samples. Each time period, 320 samples are receive by the MDCT640 unit 501 and combined with a previous 320 samples to generate a 640 sample frame. The MDCT640 unit 501 windows and transforms these 640 samples to obtain 320 transform frequency coefficients. The MDCT640 unit 501 then partitions the 320 transform frequency coefficients into frequency ranges of non-uniform width. These frequency ranges are sent to a zero-stuffing unit 503. The zero-stuffing unit 503 stuffs zero value frequency coefficients at the boundaries of the frequency ranges and drops those transform frequency coefficients shifted out of the last frequency range, as previously described.

After zero-stuffing, the zero-stuffing unit 503 sends each frequency range to a different normalization unit. In FIG. 5, the 320 transform frequency coefficients have been partitioned into 5 frequency ranges. Each of the frequency ranges is sent to a different one of normalization units 505A–505E. The energy and dynamic range of transform frequency coefficients is different for different frequency ranges. Typically, the average energy in the first frequency range is 50–80 dB large than for last frequency range. Normalizing each frequency range separately enables further computations in each frequency range using relatively simple fixed-point arithmetic. Each of the normalization units 505A–505E generates a normalization coefficient for their corresponding frequency range, which are sent to the next unit in the encoding process (e.g., the quantization unit). Each normalized frequency range then flows into one of a set of inverse MDCT units. In FIG. 5, the first frequency range flows into an IMDCT64 unit 507A and the second frequency range flows into an IMDCT64 unit 507B. The third and fourth frequency ranges respectively flow into IMDCT128 units 507C and 507D. The fifth frequency range flows into an IMDCT256 unit 507E. Each of the IMDCT units 507A–507E performs on the received normalized transform frequency coefficients inverse DCT-IV transform, windowing, and overlapping with previous normalized transform frequency coefficients. Output from the IMDCT units 507A–507E respectively flow into MDCT units 509A-509E. Output from the IMDCT units 507A–507E also flows into a sound attack based transform length decision unit 504.

The sound attack based transform length decision unit 504 analyzes the raw 640 samples and the frequency ranges from the IMDCT units 507A–507E to detect sound attacks over the entire frame and/or within each frequency range. Based on detection of a sound attack, the sound attack based transform length decision unit 504 indicates to the appropriate MDCT unit the transform length that should be performed on a certain frequency range. The sound attack based transform length decision unit 504 also indicates to a lossless encoding unit the length of transform performed.

To illustrate transform length varying based on sounds attack detection, processing of the first frequency range received by the MDCT512/128 unit 509A will be explained. If a sound attack is not detected in the first frequency range, then 256-samples long transform is used. In other words 8 output 32 transform frequency coefficients are combined to obtain a sequence of length 256. This sequence is coupled with 256 previous samples to obtain an input frame for length 512 MDCT transform performed by the MDCT512/128 unit 509A. The MDCT512/128 unit 509A will generate 256 transform frequency coefficients. If a sound attack is detected in the first frequency range, then the MDCT512/128 unit 509A is switched to short-length mode of functioning. First, a transitional frame of length 256+64=320 is transformed. After the transitional frame is transformed, short transforms of length 128 are applied to the first frequency range until a decision is made by the sound attack based transform length decision unit 504 to switch to long-length transform. Another transitional frame (of length 320) is switches from short-length to long-length mode. Although in one embodiment of the invention MDCT units perform short or long length transforms, alternative embodiments of the invention have a greater number of modes of transform length. By switching to short transform length mode, time resolution can be reduced by 4 times during sound attacks or dynamically changing signals in any frequency range.

The transform frequency coefficients generated by the MDCT units 509A–509E are sent to a multiplexer 511. The multiplexer 511 orders the received transform frequency coefficients to form a sequence that will be quantized and losslessly encoded according to a PAM.

Assuming $F_o$ denotes the sampling frequency of an audio signal and the audio signal does not includes sound attacks (i.e., all MDCT units are functioning in long-length mode), then the maximal frequency resolution for low frequencies is equal to $F_o/2/320/8$ Hz. For example, if $F_o$=44100 Hz, then frequency resolution will be equal to 8.6 Hz for the first and second frequency ranges. For the third and fourth frequency ranges their frequency resolution will be equal to 17.2 Hz. For the fifth frequency range, the frequency resolution will be equal to 68.9.5 Hz.

The audio encoder described in the above figures can be applied to application that require scalability, embedded functioning, and/or support of multiple sampling rates and multiple bit rates. For example, assume a 44.1 kHz audio signal input is partitioned into 5 frequency ranges (or subbands). The information transmitted to various users can be scaled to accommodate particular users. One set of users may receive all 5 frequency ranges whereas other users may only receive the first three frequency ranges (the lower frequency ranges). The two different sets of users are provided different bit-rates and different signal quality. The audio decoders of the set of users that receive only the lower frequency ranges reconstruct half of the time-domain samples, resulting in a 22.1 kHz signal sampling frequency. If a set of users only receive the $1^{st}$ frequency range (lowest frequency), then the reconstructed signal can be reproduced with a sampling rate of 8 or 11.025 kHz.

Decoding a Zero Stuffed Length Varied Audio Signal

Decoding a zero stuffed length varied audio signal involves performing inverse operations of encoding described above.

Figure 6:
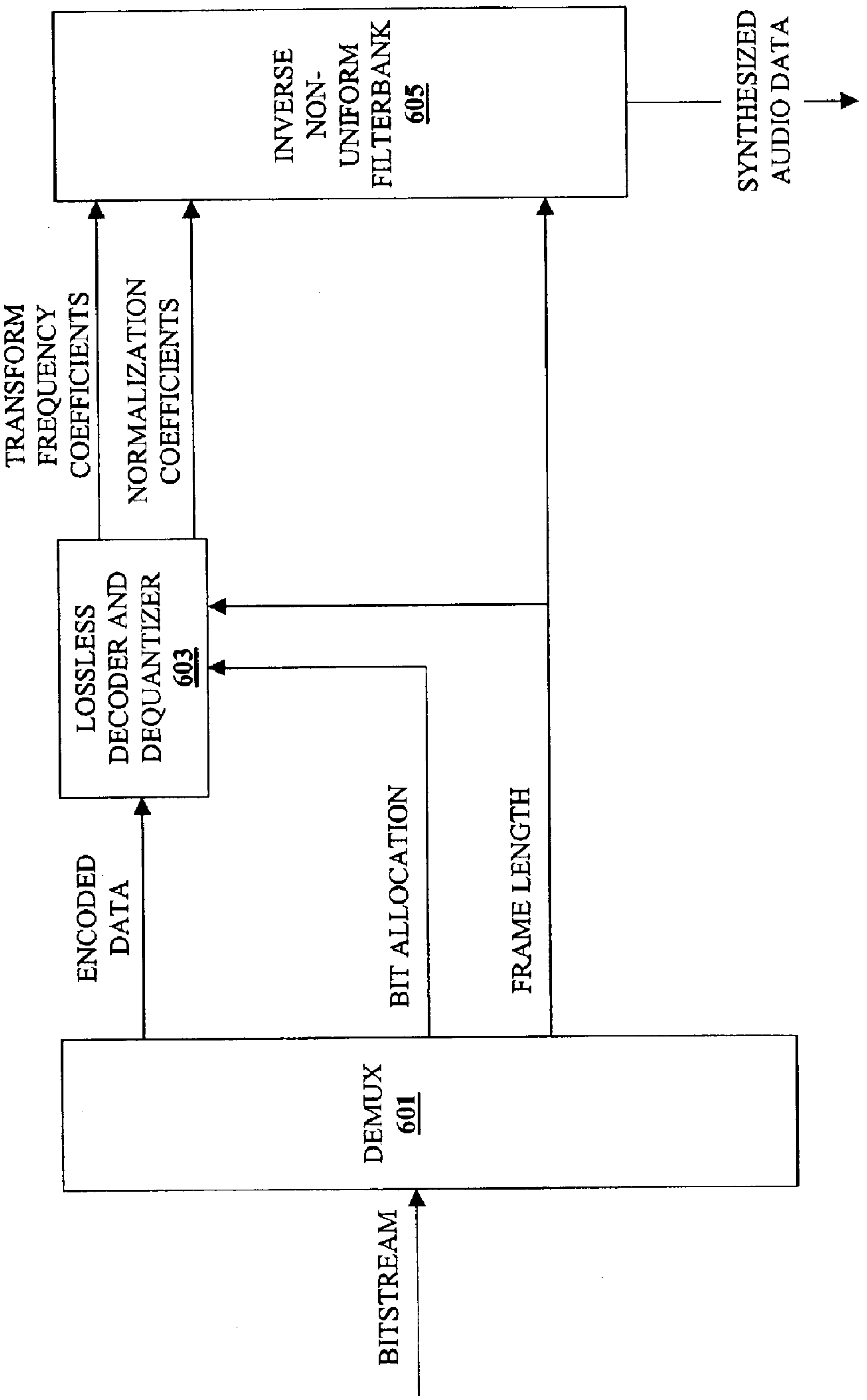
FIG. 6 is a block diagram illustrating an exemplary audio decoder according to one embodiment of the invention.

FIG. 6 is a block diagram illustrating an exemplary audio decoder according to one embodiment of the invention. A demultiplexer 601 receives a bitstream. The demultiplexer 601 is coupled with a lossless decoder and dequantizer 603 and an inverse non-uniform filterbank 605. The demultiplexer 601 extracts encoded data (quantized and encoded zero stuffed length varied transform frequency coefficients) and bit allocation from the received bitstream and sends them to the lossless decoder and dequantizer 603. The demultiplexer 601 also extracts frame length from the bitstream and sends the frame length to the lossless decoder and dequantizer 603 and the inverse non-uniform filterbank 605. The lossless decoder and dequantizer 603 uses the bit allocation and the frame length to decode and dequantize the encoded data received from the demultiplexer 601. The lossless decoder and dequantizer 603 outputs transform frequency coefficients and normalization coefficients to the inverse non-uniform filterbank 605. The inverse non-uniform filterbank 605 processes the transform frequency coefficients and the normalization coefficients to generate synthesized audio data.

Figure 7:
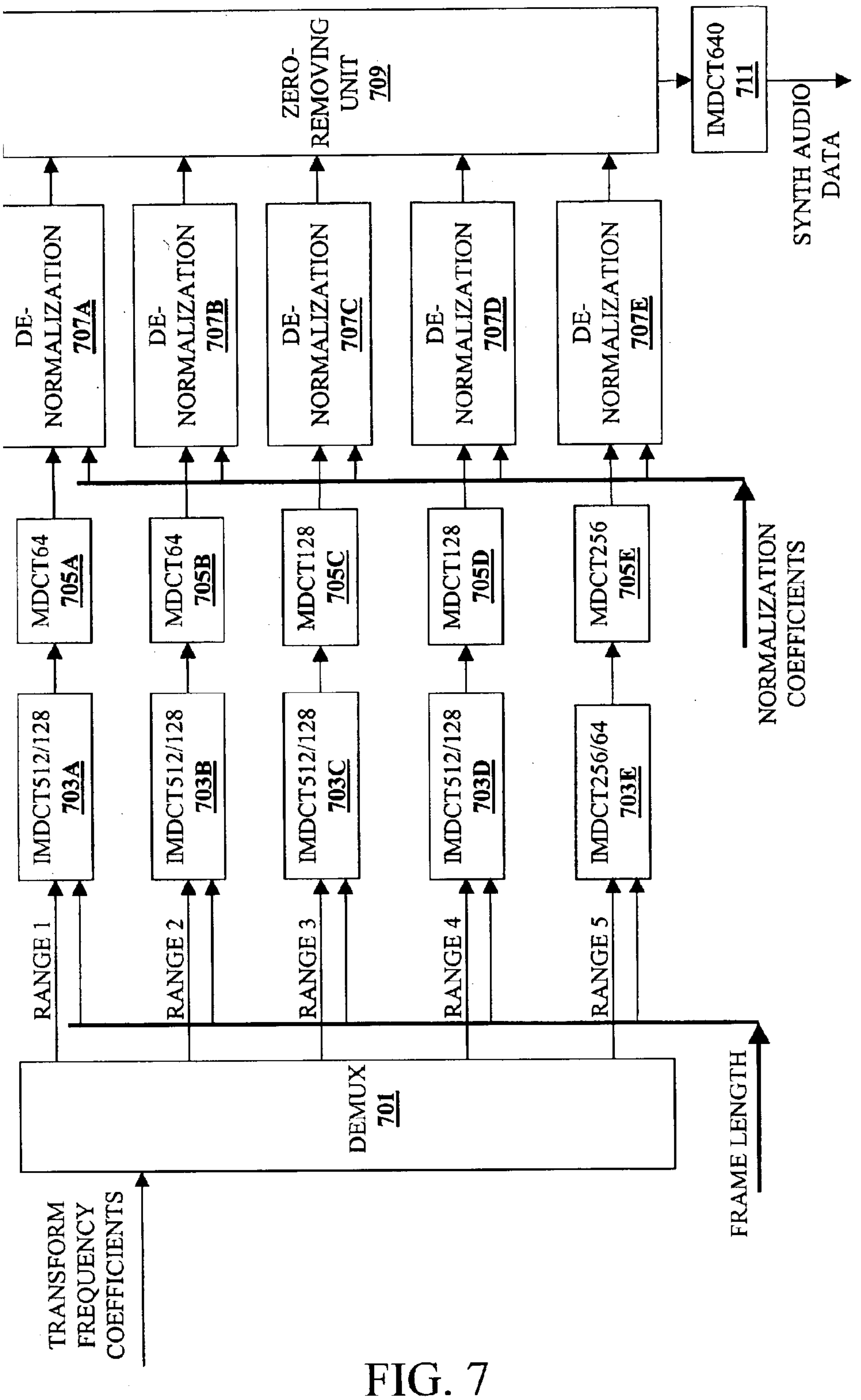
FIG. 7 is a block diagram of an exemplary inverse non-uniform filterbank according to one embodiment of the invention.

FIG. 7 is a block diagram of an exemplary inverse non-uniform filterbank according to one embodiment of the invention. A demultiplexer 701 is coupled with IMDCT units 703A–703E. The IMDCT units 703A–703D are IMDCT 512/128 units. The IMDCT unit 703E is an IMDCT 256/64. The demultiplexer 701 receives transform frequency coefficients and demultiplexes the transform frequency coefficients into frequency ranges. Frequency ranges 1–5 respectively flow to IMDCTunits 703A–703E. All of the IMDCT units 703A–703E also receive frame length. After the IMDCT units 703A–703E perform inverse MDCT on the frequency range(s) that they have received, the outputs from the IMDCT units 703A–703E respectively flow from to MDCT units 705A–705E. MDCT units 705A–705B are MDCT64 units. MDCT 705C–705D are MDCT128 units. MDCT unit 705E is an MDCT256 unit. The MDCT units 705A–705E are respectively coupled with de-normalization units 707A–707E. Outputs from the MDCT units 705A–705E respectively flow to the de-normalization units 707A–707E. The de-normalization units 707A–707E also receive normalization coefficients. The de-normalization units 707A–707E de-normalize the transform frequency coefficients received from the MDCT units 705A–705E using the normalization coefficients. The denormalized transform frequency coefficients flow into a zero-removing unit 709. The zero-removing unit 709 modifies the frequency ranges by removing boundary frequency coefficients that were originally zero value frequency coefficients.

Figure 8:
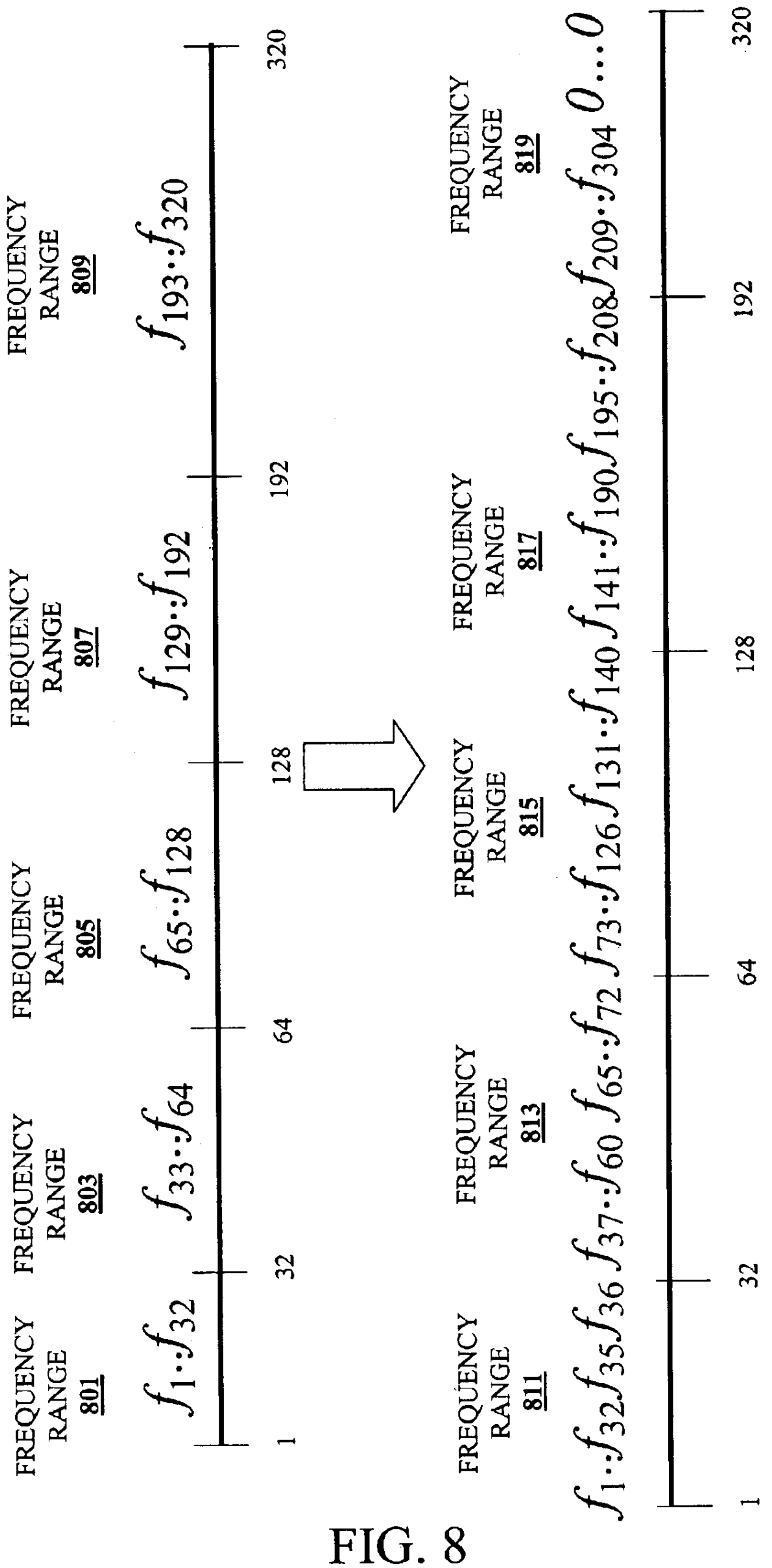
FIG. 8 is a diagram illustrating removal of boundary frequency coefficients from frequency ranges according to one embodiment of the invention.

FIG. 8 is a diagram illustrating removal of boundary frequency coefficients from frequency ranges according to one embodiment of the invention. In FIG. 8, frequency ranges 801, 803, 805, 807, and 809 respectively include transform frequency coefficients 1–32, 33–64, 65–128, 129–192, and 193–320. In the example illustrated in FIG. 8, the following transform frequency coefficients were originally zero value frequency coefficients: 31–34, 63–66, 127–130, and 191–194. After removal of boundary frequency coefficients, the resulting frequency ranges 811, 813, 815, 817, and 819 respectively include the following frequency coefficients: 1–32, 35, 36; 37–60, 65–72; 73–126, 131–140; 141–190, 195–208; and 209–304. In addition to transform frequency coefficients 209–304, the frequency range 819, which corresponds to the frequency range 809, also includes zero value frequency coefficients as the frequency coefficients 305–320.

Returning to FIG. 7, the zero-removing unit 709 passes the modified frequency ranges to an IMDCT640 unit 711. After performing inverse MDCT on the frequency ranges, the IMDCT640 unit 711 outputs synthesized audio data.

The audio encoder and decoder described above includes memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

Alternative Embodiments

While the invention has been described in terms of several embodiments, those skilled in the art will recognize that the invention is not limited to the embodiments described. For instance, while the flow diagrams show a particular order of operations performed by certain embodiments of the invention, it should be understood that such order is exemplary (e.g., alternative embodiments may perform the operations in a different order, combine certain operations, overlap certain operations, etc.). In addition, while embodiments of the invention have been described with reference to MDCT and IMDCT, alternative embodiments of the invention utilize other transform coding techniques.

Thus, the method and apparatus of the invention can be practiced with modification and alteration within the spirit and scope of the appended claims. The description is thus to be regarded as illustrative instead of limiting on the invention.

We claim:

1. A method for audio compressing comprising:

receiving an audio signal;

applying transform coding to the audio signal to generate a sequence of transform coefficients;

partitioning the sequence of transform frequency coefficients into a plurality of non-uniform width frequency ranges;

inserting zero value frequency coefficients at the boundaries of the non-uniform width frequency ranges; and dropping certain of the transform coefficients that represent high frequencies.

2. The method of claim 1 further comprising separately applying a transform to each of the plurality of non-uniform width frequency ranges.

3. The method of claim 2 wherein application of the transform is in parallel.

4. The method of claim 1 further comprising varying length of transform operations applied to each of the plurality of non-uniform width frequency ranges.

5. The method of claim 1 wherein the number of dropped transform coefficients is equal to the number of inserted zero value frequency coefficients.

6. The method of claim 1 further comprising:

constructing a psycho-acoustic model with the plurality of non-uniform width frequency ranges with inserted zero value frequency coefficients; and quantizing the plurality of non-uniform width frequency ranges with inserted zero value frequency coefficients.

7. A method for audio compression comprising:

applying a transform to a plurality of audio samples to generate a sequence of transform coefficients; and partitioning the sequence of transform coefficients into varying width frequency subbands with zero value frequency coefficients at the boundaries of the frequency subbands.

8. The method of claim 7 further comprising dropping a set of one or more transform coefficients in the highest frequency subband.

9. The method of claim 8 wherein the number of dropped transform coefficients corresponds to the number of zero value frequency coefficients stuffed at the boundaries of the frequency subbands.

10. The method of claim 7 further comprising:

constructing a psycho-acoustic model with the varying width subbands; and quantizing the varying width subbands.

11. The method of claim 7 further comprising applying transforms of varying length to each of the varying width subbands.

12. A method for audio compression comprising:

partitioning an audio input into a plurality of non-uniform frequency subbands, each of the plurality of non-uniform frequency subbands including a set of one or more frequency coefficients;

displacing those of the set of frequency coefficients at the boundary of each subband with zeros; and dropping those of the set of frequency coefficients that fall outside of the plurality of frequency subbands after the displacing.

13. The method of claim 12 further comprising separately applying a transform to each of the plurality of non-uniform frequency subbands.

14. The method of claim 13 wherein application of the transform is in parallel.

15. The method of claim 12 further comprising varying length of transform operations applied to each of the plurality of non-uniform frequency subbands.

16. The method of claim 12 wherein the number of dropped frequency coefficients is equal to the number of inserted zeros.

17. The method of claim 12 further comprising:

constructing a psycho-acoustic model with the plurality of non-uniform frequency subbands; and quantizing the plurality of non-uniform frequency subbands.

18. A machine-readable medium having a set of instruction stored thereon, which when executed by a set of one or more processors causes the set of processors to perform the operations comprising:

receiving an audio signal;

applying transform coding to the audio signal to generate a sequence of transform coefficients;

partitioning the sequence of transform coefficients into a plurality of non-uniform width frequency ranges;

inserting zero value frequency coefficients at the boundaries of the non-uniform width frequency ranges; and dropping certain of the transform coefficients that represent high frequencies.

19. The machine-readable medium of claim 18 further comprising separately applying a transform to each of the plurality of non-uniform width frequency ranges.

20. The machine-readable medium of claim 19 wherein application of the transform is in parallel.

21. The machine-readable medium of claim 18 further comprising varying length of transform operations applied to each of the plurality of non-uniform width frequency ranges.

22. The machine-readable medium of claim 18 wherein the number of dropped transform coefficients is equal to the number of inserted zero value frequency coefficients.

23. The machine-readable medium of claim 18 further comprising:

constructing a psycho-acoustic model with the plurality of non-uniform width frequency ranges with inserted zero value frequency coefficients; and quantizing the plurality of non-uniform width frequency ranges with inserted zero value frequency coefficients.

24. A machine-readable medium having a set of instruction stored thereon, which when executed by a set of one or more processors causes the set of processors to perform the operations comprising:

applying a transform to a plurality of audio samples to generate a sequence of transform coefficients; and partitioning the sequence of transform coefficients into varying width frequency subbands with zero value frequency coefficients at the boundaries of the frequency subbands.

25. The machine-readable medium of claim 24 further comprising dropping a set of one or more transform coefficients in the highest frequency subband.

26. The machine-readable medium of claim 25 wherein the number of dropped transform coefficients corresponds to the number of zero value frequency coefficients stuffed at the boundaries of the frequency subbands.

27. The machine-readable medium of claim 24 further comprising:

constructing a psycho-acoustic model with the varying width subbands; and quantizing the varying width subbands.

28. The machine-readable medium of claim 24 further comprising applying transforms of varying length to each of the varying width subbands.

29. A machine-readable medium having a set of instruction stored thereon, which when executed by a set of one or more processors causes the set of processors to perform the operations comprising:

partitioning an audio input into a plurality of non-uniform frequency subbands, each of the plurality of non-uniform frequency subbands including a set of one or more frequency coefficients;

displacing those of the set of frequency coefficients at the boundary of each subband with zeros; and dropping those of the set of frequency coefficients that fall outside of the plurality of frequency subbands after the displacing.

30. The machine-readable medium of claim 29 further comprising separately applying a transform to each of the plurality of non-uniform frequency subbands.

31. The machine-readable medium of claim 30 wherein application of the transform is in parallel.

32. The machine-readable medium of claim 29 further comprising varying length of transform operations applied to each of the plurality of non-uniform frequency subbands.

33. The machine-readable medium of claim 29 wherein the number of dropped frequency coefficients is equal to the number of inserted zeros.

34. The machine-readable medium of claim 29 further comprising:

constructing a psycho-acoustic model with the plurality of non-uniform frequency subbands; and quantizing the plurality of non-uniform frequency subbands.

* * * * *